(12) United States Patent
Huang

(10) Patent No.: US 9,939,940 B2
(45) Date of Patent: Apr. 10, 2018

(54) IN-CELL TOUCH SCREEN AND METHOD FOR DRIVING THE SAME

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventor: Weiyun Huang, Beijing (CN)

(73) Assignees: BOE TECHNOLOGY GROUP CO., LTD., Beijing (CN); CHENGDU BOE OPTOELECTRONICS TECHNOLOGY CO., Chengdu (CN)

( * ) Notice: Subject to any disclaimer, the term of this patent is extended or adjusted under 35 U.S.C. 154(b) by 28 days.

(21) Appl. No.: 14/916,444

(22) PCT Filed: Aug. 17, 2015

(86) PCT No.: PCT/CN2015/087223
§ 371 (c)(1),
(2) Date: Mar. 3, 2016

(87) PCT Pub. No.: WO2016/150081
PCT Pub. Date: Sep. 29, 2016

(65) Prior Publication Data
US 2017/0045974 A1    Feb. 16, 2017

(30) Foreign Application Priority Data
Mar. 24, 2015 (CN) .......................... 2015 1 0130521

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01)

(58) Field of Classification Search
CPC ...... G06F 3/0412; G06F 3/0416; G06F 3/044; G06F 3/041
See application file for complete search history.

(56) References Cited

U.S. PATENT DOCUMENTS 9,575,581 B2 *  2/2017  Kim ......................... G06F 3/041
9,671,883 B2 *  6/2017  Shin ....................... G06F 3/0412
(Continued)

FOREIGN PATENT DOCUMENTS

CN    103207720 A    7/2013
CN    103513808 A    1/2014
(Continued)

OTHER PUBLICATIONS

First Office Action regarding Chinese Application No. 201510130521.3, dated Mar. 20, 2017. Translation provided by Dragon Intellectual Property Law Firm.
(Continued)

*Primary Examiner* — Vijay Shankar
(74) *Attorney, Agent, or Firm* — Harness, Dickey & Pierce, P.L.C.

(57) ABSTRACT

The present disclosure relates to a field of displaying technology, and describes an in-cell touch screen and a method for driving the same. The in-cell touch screen comprises: a substrate; an electrode layer, formed on the substrate; and a touch driving module, wherein multiple rows of electrodes are formed on the electrode layer, and each row of electrodes is configured to drive at least one row of pixel units; the touch driving module comprises a plurality of signal lines corresponding to electrodes in one-to-one correspondence; and during a time period for displaying an image, when the image is to be displayed by the pixel units corresponding to a row of electrodes, the touch driving module is configured to input display driving signals to the row of electrodes and
(Continued)

input touch driving signals to the other rows of electrodes simultaneously.

20 Claims, 5 Drawing Sheets

(56) References Cited

U.S. PATENT DOCUMENTS

| | | | |
|---|---|---|---|
| 9,690,416 B2* | 6/2017 | Yao | ................ G06F 3/0416 |
| 2014/0043274 A1 | 2/2014 | Yao et al. | |
| 2014/0049486 A1 | 2/2014 | Kim et al. | |
| 2014/0184539 A1 | 7/2014 | Shin | |
| 2015/0002462 A1 | 1/2015 | Zhao et al. | |
| 2016/0370913 A1 | 12/2016 | Xie et al. | |
| 2017/0045974 A1 | 2/2017 | Huang | |

FOREIGN PATENT DOCUMENTS

| | | |
|---|---|---|
| CN | 104216561 A | 12/2014 |
| CN | 104217692 A | 12/2014 |
| CN | 104407760 A | 3/2015 |
| CN | 104679342 A | 6/2015 |

OTHER PUBLICATIONS

International Search Report and Written Opinion of the International Searching Authority for International Application No. PCT/CN2015/087223, dated Dec. 23, 2015. Translation provided by Dragon Intellectual Property Law Firm.

* cited by examiner

IN-CELL TOUCH SCREEN AND METHOD FOR DRIVING THE SAME

CROSS REFERENCE OF RELATED APPLICATION

This application is the U.S. national phase of PCT Application No. PCT/CN2015/087223 filed on Aug. 17, 2015, which claims priority to Chinese Patent Application No. 201510130521.3 filed on Mar. 24, 2015, the disclosures of which are incorporated in their entirety by reference herein.

TECHNICAL FIELD

The present disclosure relates to the field of displaying technology, in particular to an in-cell touch screen and a method for driving the same.

BACKGROUND

Currently, the in-cell touch screen is a trend in the field of touch screen display for its advantages of being of a slim size, light weight and high integration. In most of conventional in-cell products, a touch driving electrode and a common electrode always share one electrode in the touch screen. Furthermore, most of conventional in-cell products are driven in a time division driving manner, so as to prevent a display function and a touch function of the shared electrode from interfering each other. In other words, a time period for displaying one frame is divided into two parts. At one part of the time period, a electrode layer operates in the touch function by inputting a touch driving signal into the electrode layer, while the electrode layer may not operate in the display function at this point; in contrast, at the other part of the time period, the electrode layer operates in the display function by inputting a display driving signal into the electrode layer, while the electrode layer may not operate in the touch function at this point.

In the above method, although the interference between the display function and the touch function can be prevented, both the time period for the electrode operating in the touch function and the time period for the electrode operating in the display function in the time period for displaying each frame are significantly reduced. As a result, a frequency for scanning the touch signal in the electrode cannot be raised, and thus both the touch function and the display function of the touch screen deteriorate, leading to adversely affect the design of the display and the display quality, especially the high definition of the display may be difficult to be implemented, meanwhile the touch function cannot be improved either.

SUMMARY

The present disclosure provides an in-cell touch screen and a method for driving the same. With the in-cell touch screen, both the time period for displaying and the time period for touching can be assured upon driving, and both the touch function and the display function of the in-cell touch screen are improved.

For achieving the above object, the present disclosure provides the following technical solutions.

An in-cell touch screen includes: a substrate; a electrode layer, formed on the substrate; and a touch driving module, wherein multiple rows of electrodes are formed on the electrode layer and arranged in a column direction of pixel units in the in-cell touch screen, and each row of electrodes is configured to drive at least one row of pixel units in the in-cell touch screen; the touch driving module includes a plurality of signal lines which are in one-to-one correspondence to the electrodes, and the electrodes are electrically connected to the touch driving module by the signal lines; and during a time period for displaying an image, when the image is to be displayed by the pixel units corresponding to a row of electrodes, the touch driving module is configured to input display driving signals to the row of electrodes and input touch driving signals to the other rows of electrodes simultaneously.

In the above in-cell touch screen, a mode of division driving is adopted. In the electrodes arranged in array and formed by the electrode layer, when the image is to be displayed by a row of pixel units in the touch screen, the touch driving module is configured to input the display driving signals to the row of electrodes for driving the row of pixel units, and input the touch driving signals to the other rows of electrodes, until the time period of one frame elapses. Thus, during the time period of one frame, each of the rows of electrodes is scanned with the display signals in turn, and each row of electrodes is scanned with the touch signals during a time period which is a proportion, i.e. (the number of the rows of array electrodes−1)/(the number of the rows of array electrodes) of the time period of one frame, so that both the time period for scanning with the display signals and the time period for scanning with the touch signals in the in-cell touch screen can be assured; furthermore, with the mode of division driving being adopted in the in-cell touch screen, the display driving signals may be inputted to the row of electrodes while the touch driving signals may be inputted to the other rows of electrodes, so that the in-cell touch screen may be scanned with the display signals and the touch signals simultaneously. Thus, both the time period for scanning with the display signals and the time period for scanning with the touch signals in the in-cell touch screen can be ensured; and each electrode in the in-cell touch screen may be scanned with the touch signals several times during the time period of one frame, so that the frequency of scanning with the touch signals (report rate) may be several times greater than the frequency of scanning with the display signals. As a result, both the display function and the touch function of the in-cell touch screen are improved.

Alternatively, each row of electrodes is configured to drive multiple rows of pixel units.

Alternatively, the number of the rows of the pixel units driven by each row of electrodes is identical.

Alternatively, the in-cell touch screen further includes: a gate line driving module, configured to provide gate line signals to each row of pixel units by gate lines.

Alternatively, a signal synchronization module is arranged between the gate line driving module and the touch driving module.

Alternatively, the in-cell touch screen further includes: a data line driving module, configured to input data signals to corresponding data lines, causing pixel units to display.

Alternatively, all of the data line driving module, the gate line driving module and the touch driving module are integrated.

Alternatively, the in-cell touch screen further includes: a system module and a signal coordination module, wherein the system module transmits signals to both the data line driving module and the gate line driving module simultaneously by the signal coordination module, while the touch driving module transmits corresponding signals to the electrodes simultaneously.

Alternatively, each row of electrodes includes a plurality of sub-electrodes.

Alternatively, the plurality of sub-electrodes is of a same shape.

Alternatively, a projection of each of the plurality of sub-electrodes on the substrate is of a shape of a square, a rectangle, a mosaic trapezoid or a parallelogram.

Alternatively, each row of electrodes is of an integrated structure.

The present disclosure further provides a method for driving the in-cell touch screen according to any of the above technical solutions, including:

inputting display driving signals to a row of electrodes for driving a row of pixel units of the in-cell touch screen and inputting touch driving signals to the other rows of electrodes simultaneously by a touch driving module of the in-cell touch screen, when the image is to be displayed by the row of pixel units.

DETAILED DESCRIPTION

In the following, it is clearly and completely described the technical solutions according to the embodiments of the present disclosure. It is obvious that the described embodiments are merely some of all the embodiment of the present disclosure instead of all of the embodiments. All of other embodiment that those skilled in the art may be implemented based on the embodiments in the present disclosure without creative work should also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Referring to FIGS. 1-5, in an embodiment of the present disclosure, the in-cell touch screen includes:

a substrate 1;
an electrode layer 2, formed on the substrate 1; and
a touch driving module 3,
wherein multiple rows of electrodes 21 are formed on the electrode layer 2 and arranged in a column direction of pixel units in the in-cell touch screen, and each row of the electrodes 21 is configured to drive at least one row of the pixel units in the in-cell touch screen;
the touch driving module 3 includes a plurality of signal lines 31, each of which is in one-to-one correspondence to each electrode in each row of electrodes 21, and the each electrode in each row of electrodes 21 is connected to the touch driving module 3 by the signal lines 31; and
during a time period for displaying an image, when the image is to be displayed by the pixel units corresponding to a row of the electrodes 21 in the multiple rows of the electrodes, the touch driving module 3 is configured to input display driving signals to the row of the electrodes 21 and input touch driving signals to the other rows of electrodes 21 simultaneously.

Figure 1:
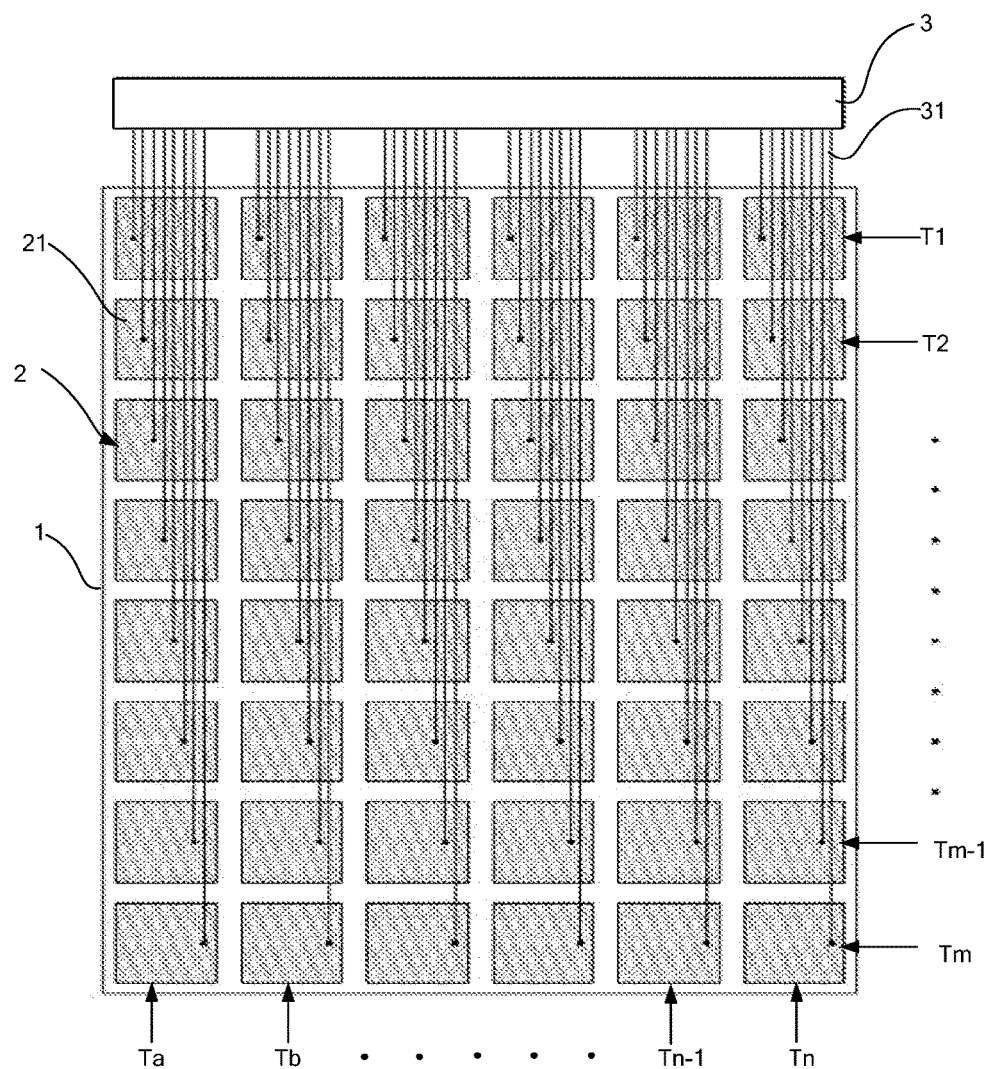
FIG. 1 is a schematic view illustrating an arrangement of the touch driving module and the rows of electrodes of the electrode layer in the in-cell touch screen according to an embodiment of the present disclosure.
Figure 5:
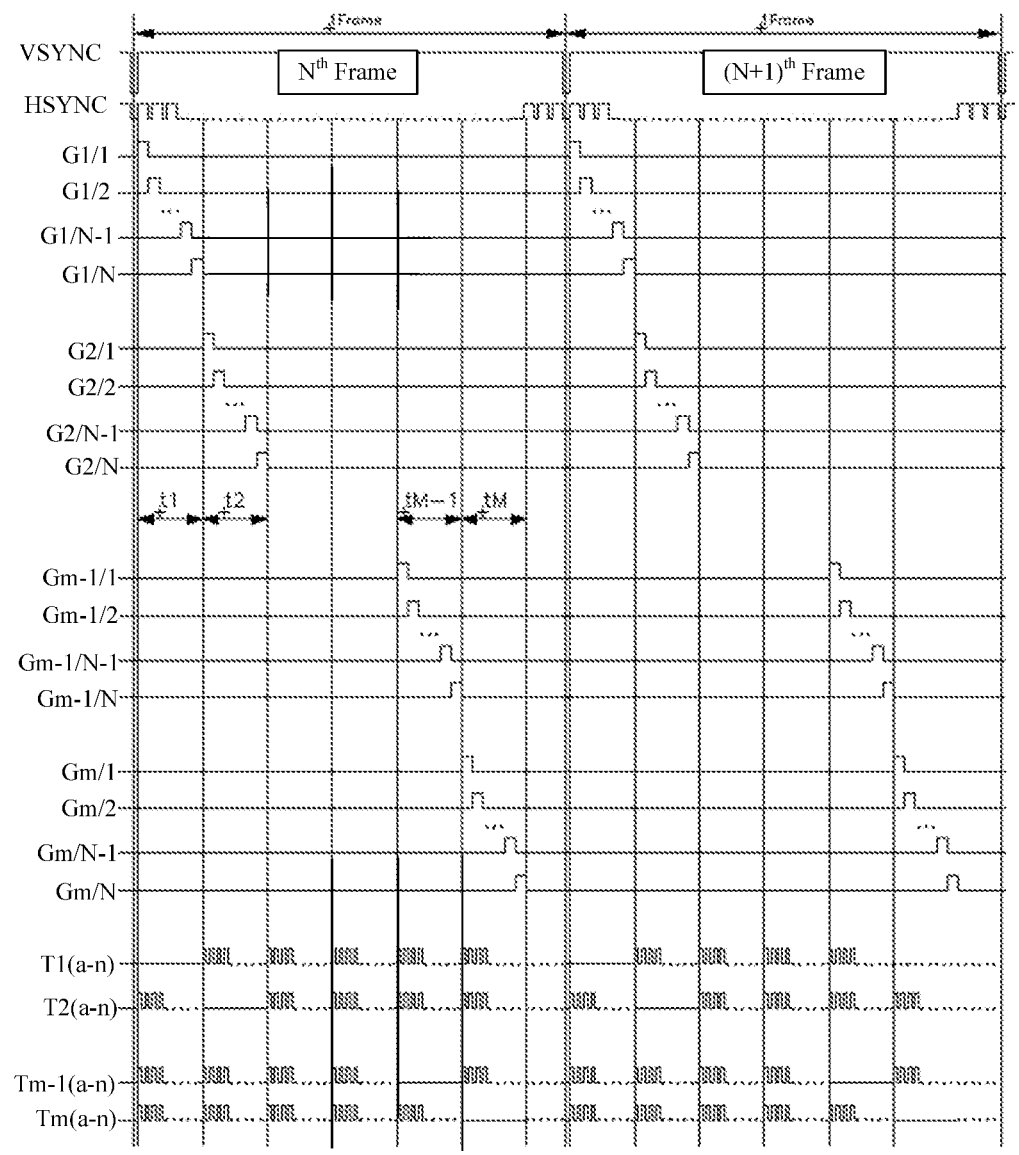
FIG. 5 is a time diagram of the division driving of the signals in the in-cell touch screen according to an embodiment of the present disclosure.

Specifically, as illustrated in FIG. 1, m rows of electrodes 21 (i.e. row T1 to row Tm of electrodes 21) are formed on the electrode layer 2 in a column direction of pixel units in the in-cell touch screen. During a time period of one frame (for example, the N-th frame as illustrated in FIG. 5), when an image is to be displayed by a row of pixel units corresponding row T1 of electrodes 21, the touch driving module 3 is configured to input display signals to row T1 of electrodes 21, and input touch scanning signals to rows T2, T3, . . . , Tm of the electrodes 21; when an image is to be displayed by a row of pixel units corresponding to row T2 of electrodes 21, the touch driving module 3 is configured to input display signals to row T2 of electrodes 21, and input touch scanning signals to rows T1, T3, . . . , Tm of the electrodes 21; and so on, until the time period of the frame elapses. FIG. 5 illustrates waveforms of the signals inputted to corresponding rows of electrodes, where T1(a-n) to Tm(a-n) represent the touch scanning signals.

It can be seen from that, during the whole time period of the N-th frame, a proportion of the time period during which row T1 of electrodes 21 is scanned with the display signals to the whole time period of one frame is 1/m, and a proportion of the rest of the time period during which Row T1 of electrodes 21 may be scanned with the touch signals to the whole time period is (m−1)/m. As a result, it is assured that there is enough time for Row T1 of electrodes 21 to be scanned with the display signals and with the touch signals during the time period of one frame.

The operation of any other row of electrodes 21 is similar to the operation of Row T1 of electrodes 21. In summary, with the mode of division driving being adopted in the in-cell touch screen, each row of electrodes may be scanned with the touch signals several times during one frame, so that the frequency of scanning with the touch signals (report rate) may be several times greater than the frequency for scanning with the display signals. As a result, both the display function and the touch function of the in-cell touch screen are improved. In another embodiment of the present disclosure, each row of electrodes 21 may be further configured to drive multiple rows of pixel units. Alternatively, the number of the rows of the pixel units driven by each row of electrodes 21 may be identical. For example, as illustrated in FIG. 2, each row of the electrodes 21 may be configured to drive N rows of pixel units.

In an alternative embodiment of the present disclosure, the in-cell touch screen further includes gate line driving modules 4. The gate line driving modules 4 provide gate electrode signals to the row of the pixel units by the gate lines 41. More specifically, the gate line driving modules 4 are divided into m groups according to the number m of the rows of the electrodes 21, and each group of the gate line driving modules 4 are connected to the pixel units corresponding to the row of electrodes 21 respectively, for example as illustrated by G1-Gm in FIG. 2. Each group of gate line driving modules 4 is responsible for inputting the gate electrode signals to the pixel units corresponding to the row of electrodes 21 which is corresponding to the group. As illustrated in FIG. 2, Group G1 of gate line driving modules 4 is configured to input the signals to gate lines G1/1, G1/2, . . . , G1/N. Alternatively, a signal synchronization module is arranged between the gate line driving modules 4 and the touch driving module 3. As illustrated in FIG. 5, two synchronization signals, i.e. HSYNC and VSYNC, are provided for the driving system of the in-cell touch screen.

Figure 2:
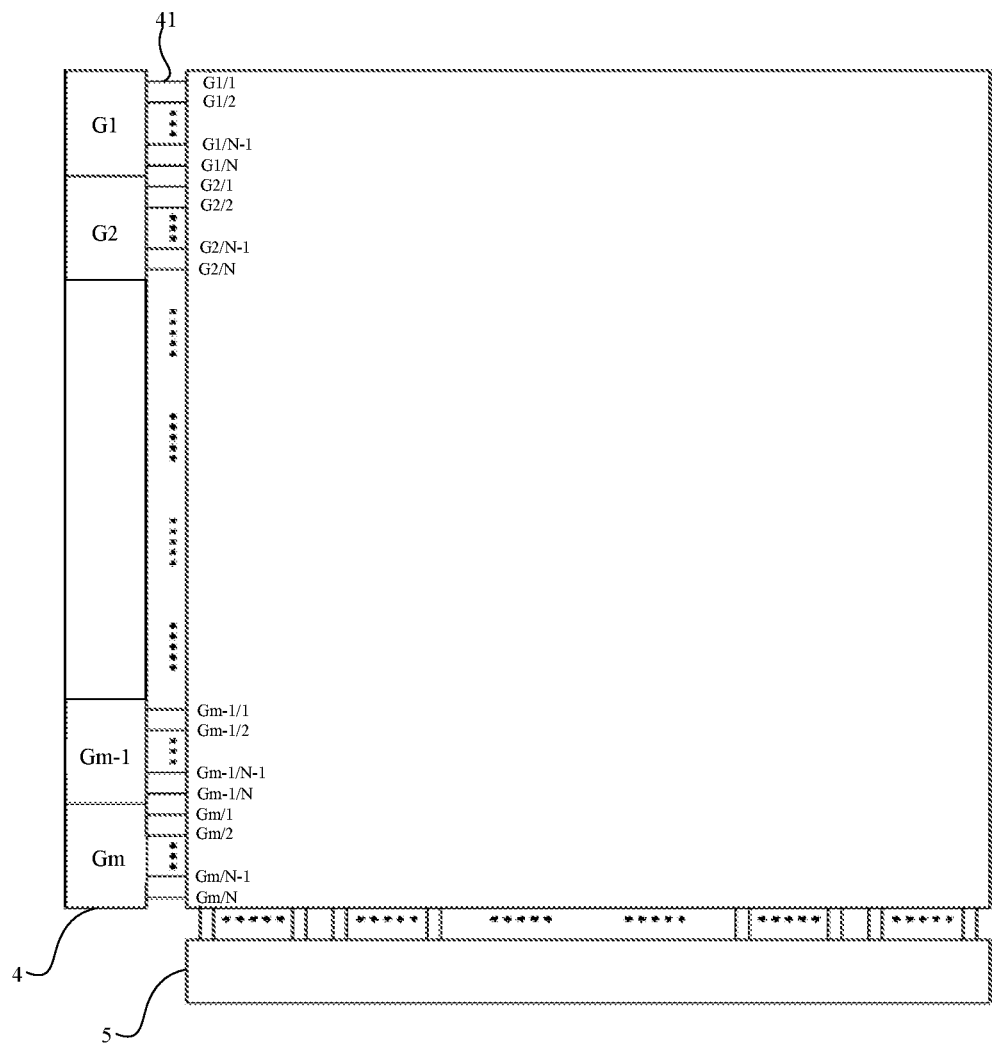
FIG. 2 is a schematic view illustrating the division of the gate line driving modules in the in-cell touch screen according to an embodiment of the present disclosure.
Figure 3:
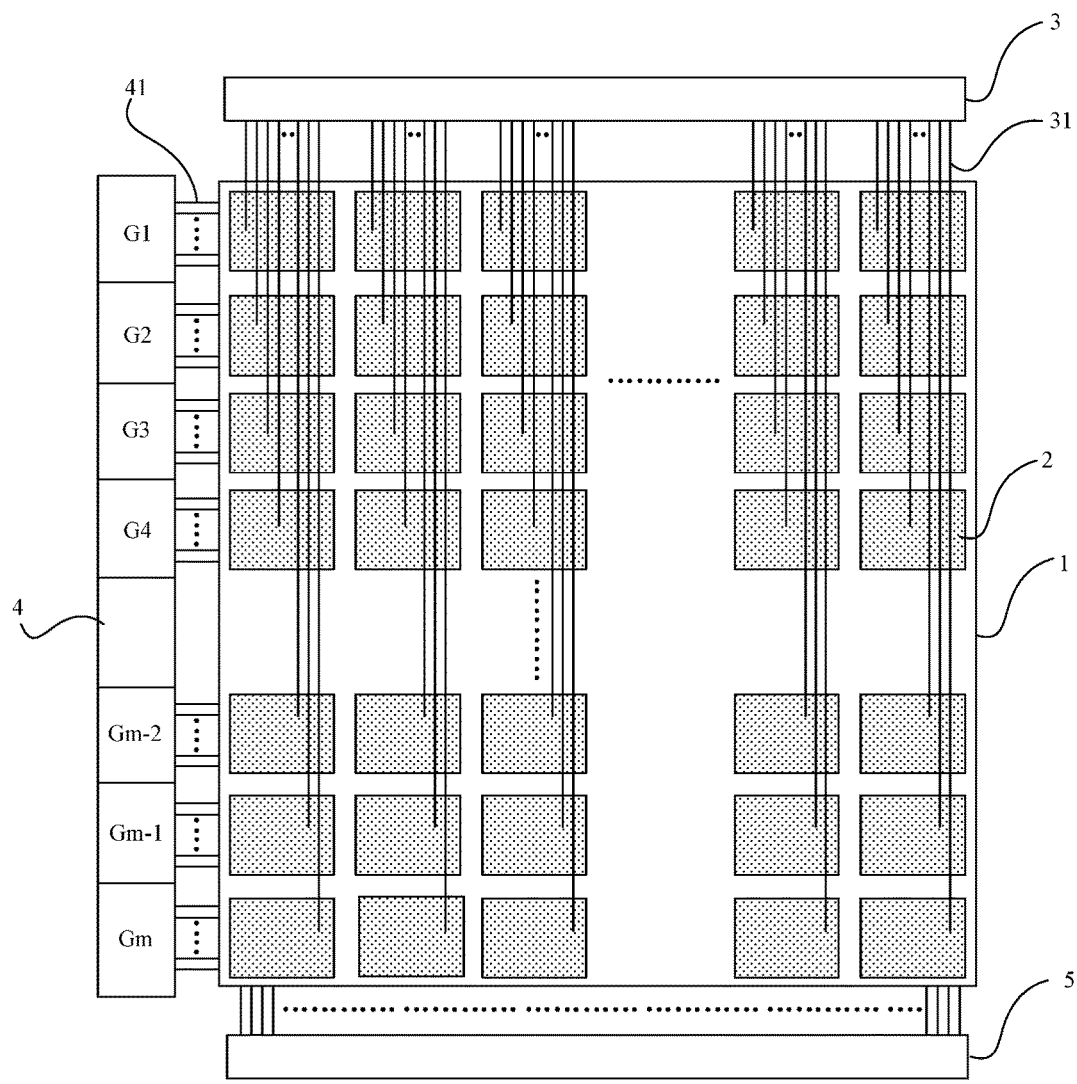
FIG. 3 is a schematic view illustrating an arrangement of the driving modules and the rows of electrodes in the in-cell touch screen according to an embodiment of the present disclosure.
Figure 4:
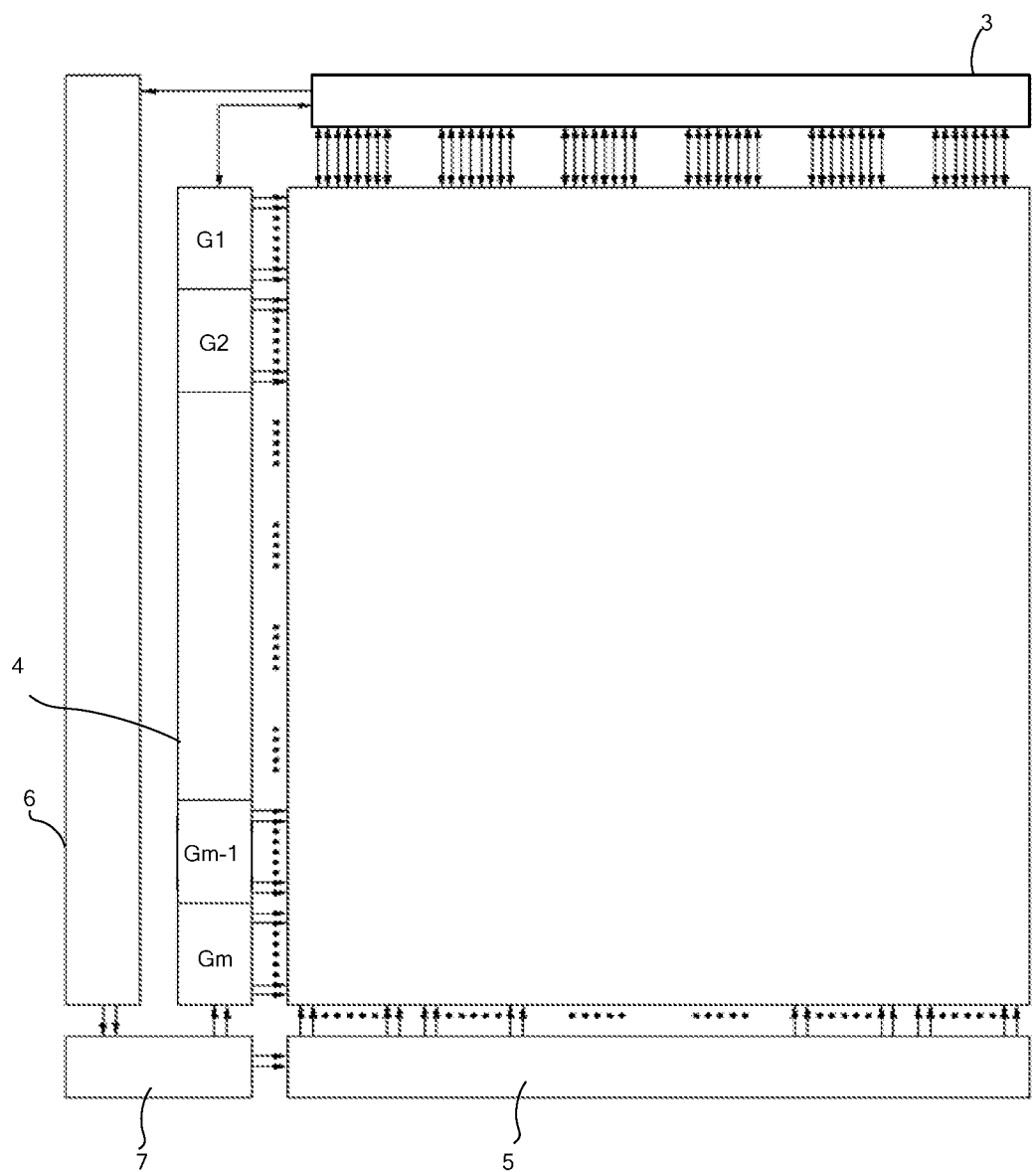
FIG. 4 is a schematic view illustrating the driving system in the in-cell touch screen according to an embodiment of the present disclosure.

As illustrate in FIGS. 2-4, the in-cell touch screen further includes a data line driving module 5. The data line driving module 5 is configured for inputting data signals to corresponding data lines, causing pixel units to display. The data line driving module 5 may be integrated with the gate line driving modules 4 and the touch driving module 3, so as to reduce the size of the frame of the in-cell touch screen.

In an alternative embodiment, the in-cell touch screen further includes a system module 6 and a signal coordination module 7. As illustrated in FIG. 4, when the in-cell touch screen is to be driven, the system module 6 transmits signals to both the data line driving module 5 and the gate line driving modules 4 simultaneously by the signal coordination module 7, while the touch driving module 3 transmits corresponding signals to the corresponding electrodes simultaneously. Here, the signals transmitted by the system module 6 to both the data line driving module 5 and the gate line driving modules 4 may be different or identical.

In a further embodiment based on the above embodiments, in the in-cell touch screen, each row of electrodes 21 may include a plurality of sub-electrodes, as illustrated in FIGS. 1 and 3. The touch driving module 3 has data lines which are in one-to-one correspondence to the sub-electrodes. In the above in-cell touch screen, when the signal line 31 between a sub-electrode of the row of electrodes 21 and the touch driving module 3 is broken, the other sub-electrodes of the row of the electrodes may still operate properly, and thus the product quality is improved.

In an alternative embodiment, each of the plurality of sub-electrodes is of a same shape. More specifically, a projection of each of the plurality of sub-electrodes on the substrate 1 may be of a shape of a square, a rectangle, a mosaic trapezoid or a parallelogram.

In another embodiment of the present disclosure, each row of electrodes may be of an integrated structure.

Furthermore, the present disclosure further provides a method for driving the in-cell touch screen according to any of the above embodiments, including:

inputting display driving signals to a row of electrodes for driving a row of pixel units of the in-cell touch screen and inputting touch driving signals to the other rows of electrodes simultaneously by a touch driving module of the in-cell touch screen, when an image is to be displayed by the row of pixel units.

It is appreciated that those skilled in the art may modify and improve the embodiments of the present disclosure without departing from the spirit and principle of the present disclosure. As a result, if those modification and improvement falls within the scope of claims and the equivalence thereof, those modification and improvement fall within the scope of the present disclosure.

What is claimed is:

1. An in-cell touch screen, comprising:
    a substrate;
    an electrode layer, formed on the substrate; and
    a touch driving module, wherein,
    multiple rows of electrodes are formed on the electrode layer and arranged in a column direction of pixel units in the in-cell touch screen, and each row of electrodes is configured to drive at least one row of pixel units in the in-cell touch screen;
    the touch driving module comprises a plurality of signal lines, wherein each signal line of the plurality of signal lines is in one-to-one correspondence to each electrode in each row of electrodes, and each electrode in each row of electrodes is electrically connected to the touch driving module by the signal line; and
    during a time period for displaying an image, when the image is to be displayed by the pixel units corresponding to a row of electrodes in the multiple rows of the electrodes, the touch driving module is configured to input display driving signals to the row of electrodes and input touch driving signals to the other rows of electrodes simultaneously.

2. The in-cell touch screen according to claim 1, wherein each row of electrodes is configured to drive multiple rows of pixel units.

3. The in-cell touch screen according to claim 1, wherein the number of the rows of pixel units driven by each row of electrodes is identical.

4. The in-cell touch screen according to claim 1, further comprising: a gate line driving module, configured to provide at least one gate line signal to the at least one row of pixel units by at least one gate line corresponding to each row of electrodes.

5. The in-cell touch screen according to claim 4, wherein a signal synchronization module is arranged between the gate line driving module and the touch driving module.

6. The in-cell touch screen according to claim 4, further comprising: a data line driving module, configured to input data signals to corresponding data lines, causing the at least one row of pixel units to display.

7. The in-cell touch screen according to claim 6, wherein the data line driving module, the gate line driving module and the touch driving module are integrated.

8. The in-cell touch screen according to claim 6, further comprising a system module and a signal coordination module, wherein the system module transmits signals to both the data line driving module and the gate line driving module simultaneously by the signal coordination module, while the touch driving module transmits corresponding signals to the multiple rows of electrodes simultaneously.

9. The in-cell touch screen according to claim 1, wherein each row of electrodes comprises a plurality of sub-electrodes.

10. The in-cell touch screen according to claim 9, wherein the plurality of sub-electrodes are of a same shape.

11. The in-cell touch screen according to claim 10, wherein a projection of each of the plurality of sub-electrodes on the substrate is of a shape of a square, a rectangle, a mosaic trapezoid or a parallelogram.

12. The in-cell touch screen according to claim 1, wherein each row of electrodes is of an integrated structure.

13. A method for driving the in-cell touch screen according to claim 1, comprising:

inputting display driving signals to a row of electrodes for driving a row of pixel units of the in-cell touch screen, and inputting touch driving signals to the other rows of electrodes simultaneously by a touch driving module of the in-cell touch screen, when an image is to be displayed by the row of pixel units.

14. The in-cell touch screen according to claim 2, wherein each row of electrodes comprises a plurality of sub-electrodes.

15. The in-cell touch screen according to claim 3, wherein each row of electrodes comprises a plurality of sub-electrodes.

16. The in-cell touch screen according to claim 4, wherein each row of electrodes comprises a plurality of sub-electrodes.

17. The in-cell touch screen according to claim 5, wherein each row of electrodes comprises a plurality of sub-electrodes.

18. The in-cell touch screen according to claim 6, wherein each row of electrodes comprises a plurality of sub-electrodes.

19. The in-cell touch screen according to claim 7, wherein each row of electrodes comprises a plurality of sub-electrodes.

20. The in-cell touch screen according to claim 8, wherein each row of electrodes comprises a plurality of sub-electrodes.

* * * * *

UNITED STATES PATENT AND TRADEMARK OFFICE
CERTIFICATE OF CORRECTION

PATENT NO. : 9,939,940 B2
APPLICATION NO. : 14/916444
DATED : April 10, 2018
INVENTOR(S) : Weiyun Huang Page 1 of 1

It is certified that error appears in the above-identified patent and that said Letters Patent is hereby corrected as shown below:

On the Title Page

Item (73) the second assignee is incorrectly listed as:
CHENGDU BOE OPTOELECTRONICS TECHNOLOGY CO.,
Should be listed as:
CHENGDU BOE OPTOELECTRONICS TECHNOLOGY CO., LTD.

Signed and Sealed this
Sixteenth Day of October, 2018

Andrei Iancu
*Director of the United States Patent and Trademark Office*